(12) United States Patent
Wang

(10) Patent No.: US 11,409,166 B2
(45) Date of Patent: Aug. 9, 2022

(54) DISPLAY PANEL AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Huiping Wang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 656 days.

(21) Appl. No.: 16/326,907

(22) PCT Filed: Nov. 1, 2018

(86) PCT No.: PCT/CN2018/113369
§ 371 (c)(1),
(2) Date: Feb. 20, 2019

(87) PCT Pub. No.: WO2020/073385
PCT Pub. Date: Apr. 16, 2020

(65) Prior Publication Data
US 2021/0333583 A1 Oct. 28, 2021

(30) Foreign Application Priority Data
Oct. 10, 2018 (CN) .......................... 201811179587.1

(51) Int. Cl.
*G02F 1/1339* (2006.01)
*G02F 1/1335* (2006.01)

(52) U.S. Cl.
CPC ...... *G02F 1/1339* (2013.01); *G02F 1/133512* (2013.01)

(58) Field of Classification Search
CPC .................................................. G02F 1/1339
See application file for complete search history.

(56) References Cited

U.S. PATENT DOCUMENTS

2011/0090445 A1* 4/2011 Kim ...................... G02F 1/1339
349/139
2011/0194062 A1* 8/2011 Lee ....................... G02F 1/1339
349/149

(Continued)

FOREIGN PATENT DOCUMENTS

CN 101697043 A 4/2010
CN 102200663 A 9/2011

(Continued)

OTHER PUBLICATIONS

International Search Report issued in corresponding International application No. PCT/CN2018/113369, dated Jul. 7, 2019(6 pages).

(Continued)

*Primary Examiner* — Edmond C Lau

(57) ABSTRACT

The present disclosure provides a display panel and a display device. The display panel includes a first substrate, a second substrate disposed opposite to the first substrate, a display area, a sealant disposed in the non-display area of the display panel, a gold ball coating area disposed in the non-display area, and a retaining wall disposed between the gold ball coating area and the display area. The retaining wall is configured to block a gold ball from flowing into the display area.

17 Claims, 3 Drawing Sheets

(56) References Cited

U.S. PATENT DOCUMENTS

2016/0252771 A1* 9/2016 Hong .................. G02F 1/13394
                                                          349/110
2018/0039009 A1* 2/2018 Chong .............. G02F 1/136286

FOREIGN PATENT DOCUMENTS

| CN | 102314026 A | 1/2012 |
| CN | 202126545 U | 1/2012 |
| CN | 103698947 A | 4/2014 |
| CN | 103869512 A | 6/2014 |
| KR | 20080099412 A | 11/2008 |

OTHER PUBLICATIONS

First Office Action from China patent office in a counterpart Chinese patent Application 201811179587.1, dated Mar. 13, 2020 (7 pages).
Written Opinion of the International Searching Authority for No. PCT/CN2018/113369.

* cited by examiner

DISPLAY PANEL AND DISPLAY DEVICE

The present application claims foreign priority to Chinese Patent Application No. CN201811179587.1, titled: DISPLAY PANEL AND DISPLAY DEVICE, filed on Oct. 10, 2018 in the State Intellectual Property Office of China, and the entire contents of which is hereby incorporated by reference.

TECHNICAL FIELD

The present disclosure relates to a field of display technology, and in particular to a display panel and a display device.

BACKGROUND

It should be understood that the statements herein merely provide background information related to the present disclosure and do not necessarily constitute prior art. A display apparatus has advantages, such as having a thin body, saving-power, low radiation, and is widely used. Conventional display apparatuses known to the Applicant are mostly backlight display apparatuses, which comprises a liquid crystal display (LCD) panel and a backlight module. Operating principle of the display apparatus is that liquid crystal (LC) molecules are disposed between two substrates, where the two substrates are parallelly disposed, and a driver voltage applies on the two substrates to control rotation direction of the LC molecules, so that light of a backlight module are refracted to generate images.

Demand for narrow bezels in LCDs has always been a development direction of LCDs. A center of a gold ball coating area (transfer pad) is disposed on an inner side of a center of a sealant area (seal), so that an internal gold ball is not easy to be corroded. However, when the gold ball is pressed together with the sealant, the gold ball easily overflows from a transfer area and flows into the display (AA) area due to limited space.

At present, there is no actual object such as a retaining wall that a height of which is at least 2.3 um and no more than 3.1 um to prevent the gold ball from flowing into to the display (AA) area, thus still having light leakage issues.

SUMMARY

The present disclosure provides a display panel and a display device to solve a technical problem that a gold ball flows to the display area to cause light leakage.

To achieve the above object, the present disclosure provides a display panel.
The display panel comprises:
 a first substrate,
 a second substrate disposed opposite to the first substrate,
 a display area,
 a sealant disposed in the non-display area of the display panel,
 a gold ball coating area disposed in the non-display area, and
 a retaining wall disposed between the gold ball coating area and the display area.
The retaining wall is configured to block the gold ball from flowing into the display area.

Optionally, the gold ball coating area comprises the gold ball and a transfer pad. The gold ball is disposed on the transfer pad, and is electrically connected with the transfer pad. A groove is disposed on the second substrate, and the transfer pad is disposed at a bottom portion of the groove. The retaining wall is disposed at an edge of a side of the groove close to the display area.

Optionally, both ends of the retaining wall exceed the gold ball coating area, and a length of the retaining wall exceeding the gold ball coating area is at least 20 um and no more than 1000 um.

Optionally, both of the display area and the non-display area comprise support columns. The support columns support the first substrate and the second substrate to form an interval. The retaining wall and the support column are made of same material.

Optionally, a height of the retaining wall is smaller than the support column disposed in the display area. The height of the retaining wall is at least 2.3 um and no more than 3.1 um.

Optionally, the display panel comprises a first substrate, a second substrate disposed opposite to the first substrate, a display area, a sealant disposed in the non-display area of the display panel, a gold ball coating area disposed in the non-display area, and a retaining wall disposed between the gold ball coating area and the display area. A width of the sealant is at least 800 um and no more than 1500 um. The retaining wall is configured to block a gold ball from flowing into the display area. A height of the retaining wall is at least 2.3 um and no more than 3.1 um. The first substrate comprises the display area, the non-display area disposed in an outer periphery of the display area, a first glass substrate, a black matrix layer formed on the first glass substrate and across the display area and the non-display area, a color photoresist layer formed on the black matrix layer disposed in the display area, and a first electrode layer formed on an entire surface of an uppermost layer of the first substrate. The second substrate also comprises the display area. The display area comprises an array device and a pixel electrode. And the non-display area comprises an outer periphery double-layer metal wiring, an insulating layer, a second metal layer, a gate insulating layer, a first metal layer. The first substrate and the second substrate are connected by the sealant.

A second electrode layer is disposed at a bottom portion of a groove, acted as a transfer pad. The first metal layer and the first electrode layer are electrically connected through the gold ball. The insulating layer and the second substrate are parallelly disposed. The retaining wall is vertically disposed on a first surface of the insulating layer. A thickness of the insulating layer is at least 1800 Å and no more than 2800 Å. The second metal layer is disposed opposite to the insulating layer and is disposed below the insulating layer. A thickness of the second metal layer is at least 3000 Å and no more than 4000 Å.

A bottom portion of the gate insulating layer is horizontally connected with the transfer pad. A thickness of the gate insulating layer is at least 3500 Å and no more than 4500 Å.

The first metal layer is parallel with the transfer pad to support the transfer pad and is electrically connected with the gold ball to form a connection electrode. A thickness of the first metal layer is at least 3500 Å and no more than 4000 Å. The gold ball coating area comprises the gold ball and the transfer pad, where the transfer pad is disposed in the non-display area. The gold ball is disposed on the transfer pad and is electrically connected with the transfer pad. The second electrode layer is disposed on the transfer pad. A width of the transfer pad is at least 900 um and no more than 1200 um. A groove is disposed at a position corresponding to the transfer pad. The transfer pad is disposed on a bottom portion of the groove. A depth of the groove across the insulating layer, the second metal layer, and the gate insulating layer. And the bottom portion of the groove is disposed corresponding to the second electrode layer.

Optionally, the retaining wall is disposed around the gold ball. The retaining wall comprises a first vertical edge, a second vertical edge, and an arc-shaped edge. The first vertical edge and the second vertical edge are respectively disposed on two sides of the gold ball. An end of the first vertical edge close to the display area and an end of the second vertical edge close to the display area are connected by the arc-shaped edge. Each gold ball coating area corresponds to one retaining wall.

Optionally, the retaining wall is disposed around the gold ball.

Optionally, the height of the retaining wall is less than a height of the support column disposed in the display area.

Optionally, a length of the retaining wall is equal to a length of the gold ball coating area.

Optionally, the gold ball coating area comprises the gold ball and a transfer pad. The gold ball is disposed on the transfer pad and electrically connected with the transfer pad. The transfer pad is the second electrode layer, and is electrically connected with the first electrode layer. A groove is disposed on the second substrate, and the transfer pad is disposed at a bottom portion of the groove. The retaining wall is disposed on the transfer pad.

The present disclosure further provides a display panel. The display panel comprises a first substrate, a second substrate disposed opposite to the first substrate, a display area, a sealant disposed in the non-display area of the display panel, a gold ball coating area disposed in the non-display area, and a retaining wall disposed between the gold ball coating area and the display area. The retaining wall is configured to block a gold ball from flowing into the display area. The gold ball coating area comprises the gold ball and a transfer pad. The gold ball is disposed on the transfer pad and is electrically connected with the transfer pad. A groove is disposed on the second substrate, and the transfer pad is disposed at a bottom portion of the groove. The retaining wall is disposed at an edge of a side of the groove close to the display area. The retaining wall does not coincide with the transfer pad, but the retaining wall is in a place to be bordered with the transfer pad. Both ends of the retaining wall exceed the gold ball coating area, and a length of the retaining wall exceeding the gold ball coating area is at least 20 um and no more than 1000 um. Both of the display area and the non-display area comprise support columns. The support columns support the first substrate and the second substrate to form an interval. The retaining wall and the support column are made of same material. The height of the retaining wall is less than the height of the support column disposed in the display area. A height of the retaining wall is at least 2.3 um and no more than 3.1 um.

The present disclosure further provides a display device. The display device comprises a display panel. The display panel comprises a first substrate, a second substrate disposed opposite to the first substrate, a display area, a sealant disposed in the non-display area of the display panel, a gold ball coating area disposed in the non-display area, and a retaining wall disposed between the gold ball coating area and the display area. The retaining wall is configured to block a gold ball from flowing into the display area.

Optionally, the gold ball coating area comprises the gold ball and a transfer pad. The gold ball is disposed on the transfer pad, and is electrically connected with the transfer pad. A groove is disposed on the second substrate, and the transfer pad is disposed at a bottom portion of the groove. The retaining wall is disposed at an edge of a side of the groove close to the display area.

Optionally, both ends of the retaining wall exceed the gold ball coating area, and a length of the retaining wall exceeding the gold ball coating area is at least 20 um and no more than 1000 um.

Optionally, the display panel comprises a support column. The support column supports the first substrate and the second substrate to form an interval. The retaining wall and the support column are made of same material.

In the display panel, when the gold Ball is pressed together with the sealant, the gold Ball is overflowed from a transfer area and flows into the display area due to limited space. The retaining wall blocks the gold ball from flowing into the display area, and ultimately prevents light leakage and improves a display quality of the display panel.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present disclosure will be further described in detail below in combination with the drawings and optional embodiments.

Figure 1:
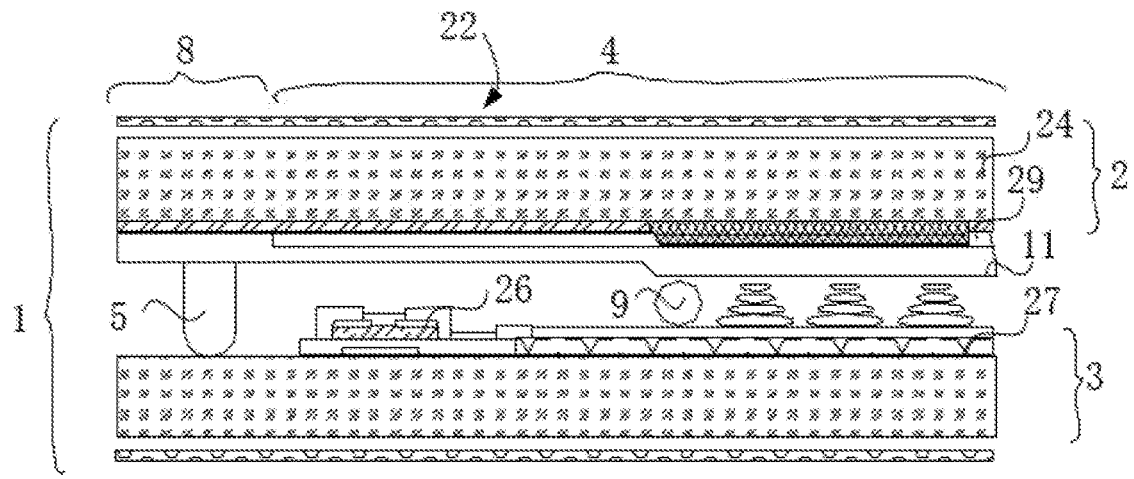
FIG. 1 is a schematic diagram showing an overall structure of a display panel according to an embodiment of the present disclosure.
Figure 2:
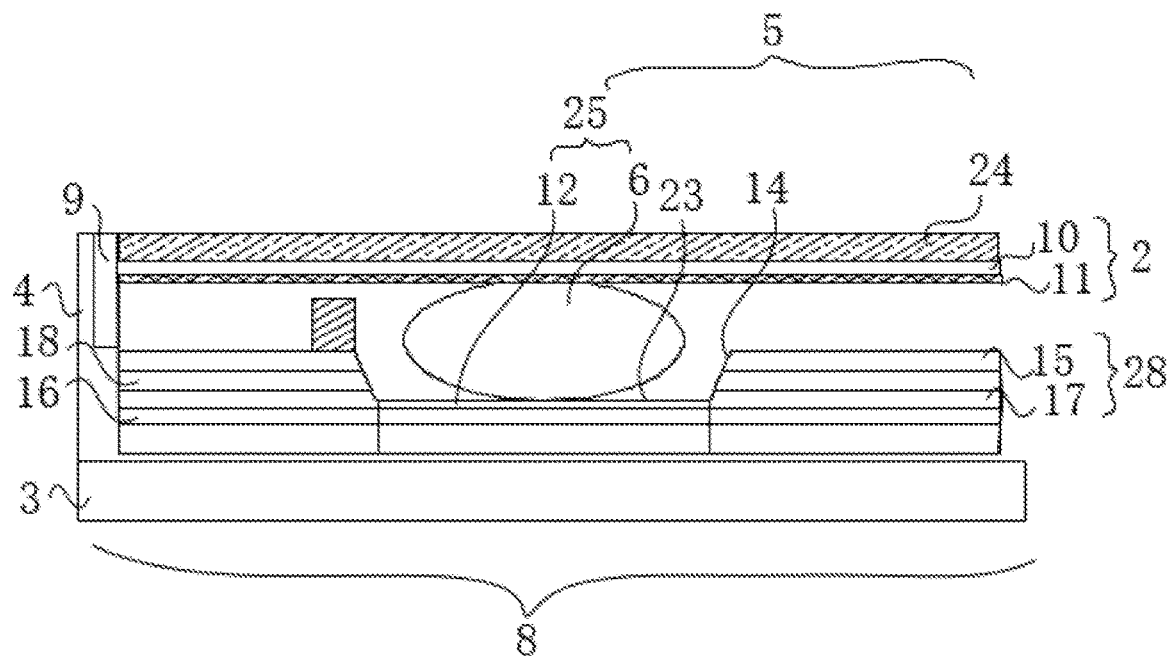
FIG. 2 is a schematic diagram showing a cross-sectional structure of a panel according to an embodiment of the present disclosure.

As shown in FIG. 1 and FIG. 2, the present disclosure provides a display panel.

The display panel 1 comprises a first substrate 2, a second substrate 3 disposed opposite to the first substrate 2, a display area 4, a sealant 5 disposed in the non-display area 8 of the display panel 1, a gold ball coating area 25 disposed in the non-display area 8, and a retaining wall 7 disposed between the gold ball coating area 25 and the display area 4. The retaining wall 7 is configured to block the gold ball 6 from flowing into the display area 4. The gold ball coating area 25 comprises the gold ball 6 and a transfer pad 12. The gold ball 6 is disposed on the transfer pad 12, and is electrically connected with the transfer pad 12. A groove 14 is disposed on the second substrate 3. And the transfer pad 12 is disposed at a bottom portion of the groove 14. The retaining wall 7 is disposed at an edge of a side of the groove 14 close to the display area 4. Both ends of the retaining wall 7 exceed the gold ball coating area 25, and a length of the retaining wall 7 exceeding the gold ball coating area 25 is at least 20 um and no more than 1000 um. Both of the display area 4 and the non-display area 8 comprise support columns 9. The support column 9 supports the first substrate 2 and the second substrate 3 to form an interval. The retaining wall 7 and the support column 9 are made of same material. The height of the retaining wall 7 is smaller than the height of the support column 9 disposed in the display area 4. The height of the retaining wall 7 is at least 2.3 um, and no more than 3.1 um.

In the display panel 1, the retaining wall 7 blocks the gold ball 6 from flowing into the display area 4, thereby preventing light leakage and improving a display quality of the display panel 1. The groove 14 has a certain height to block the gold ball 6 from flowing out. A portion of the groove 14 that is higher than the gold ball 6 blocks the gold ball 6. Combined with the retaining wall 7, a height of the groove and the retaining wall 7 is much higher than a height of the gold ball, which provides a better protective effect to the gold ball 6, save a part of the retaining wall 7, and saves material. The retaining wall 7 is a long strip to completely block the display area 4. A length of both ends of the retaining wall 7 exceeded the gold ball coating area 25 is defined as L1, which prevents the gold ball 6 from flowing into the display area 4, makes a comprehensive protection to the gold ball 6, makes the side does not leak light, improves an anti-light leakage effect, makes material being reused, and saves cost. The support column 9 itself is relatively high, and the retaining wall 7 also has a height requirement. When heights of the two are not much different, the support column 9 and the retaining wall 7 are able to be conveniently produced by a same mask process. The retaining wall 7 does not contact an upper substrate, and leaves some space for a movement of the gold ball 6. Because there are electrodes in the display panel, there will be heat dissipation, some spaces are left for physical changes that the retaining wall 7 would occur to prevent the upper substrate from hurting.

In another embodiment, as shown in FIG. 1 to FIG. 5, the present disclosure provides a display panel 1.

The display panel 1 comprises a first substrate 2, a second substrate 3 disposed opposite to the first substrate 2, a display area 4, a sealant 5 disposed in the non-display area 8 of the display panel 1, a gold ball coating area 25 disposed in the non-display area 8, and a retaining wall 7 disposed between the gold ball coating area 25 and the display area 4. The retaining wall 7 is configured to block a gold ball 6 from flowing into the display area 4.

In the display panel 1, the retaining wall 7 blocks the gold ball 6 from flowing into the display area 4, thereby preventing light leakage and improving a display quality of the display panel 1.

In an embodiment, the gold ball coating area 25 comprises the gold ball 6 and a transfer pad 12. The gold ball 6 is disposed on the transfer pad 12, and is electrically connected with the transfer pad 12. A groove 14 is disposed on the second substrate 3. And the transfer pad 12 is disposed at a bottom portion of the groove 14. The retaining wall 7 is disposed at an edge of a side of the groove 14 close to the display area 4.

The groove 14 is square-shaped. The groove 14 has a certain height to block the gold ball 6 from flowing out. A portion of the groove 14 that is higher than the gold ball 6 blocks the gold ball 6. Combined with the retaining wall 7, a height of the groove and the retaining wall 7 is much higher than a height of the gold ball, which provides a better protective effect to the gold ball 6, save a part of the retaining wall 7, and save materials.

In an embodiment, a height of the retaining wall 7 is equal to a length of the gold ball coating area 25.

The height of the retaining wall 7 is equal to the length of the gold ball coating area 25, which correspondingly blocks the gold ball 6 from flowing into the display area.

In an embodiment, a height of the retaining wall 7 is less than a height of the support column 9 disposed in the display area 4.

The support column 9 is used as a reference object, and the height of the retaining wall 7 is lower than the support column 9 disposed in the display area. The retaining wall 7 blocks the gold ball 6 from flowing into the display area 4.

Figure 3:
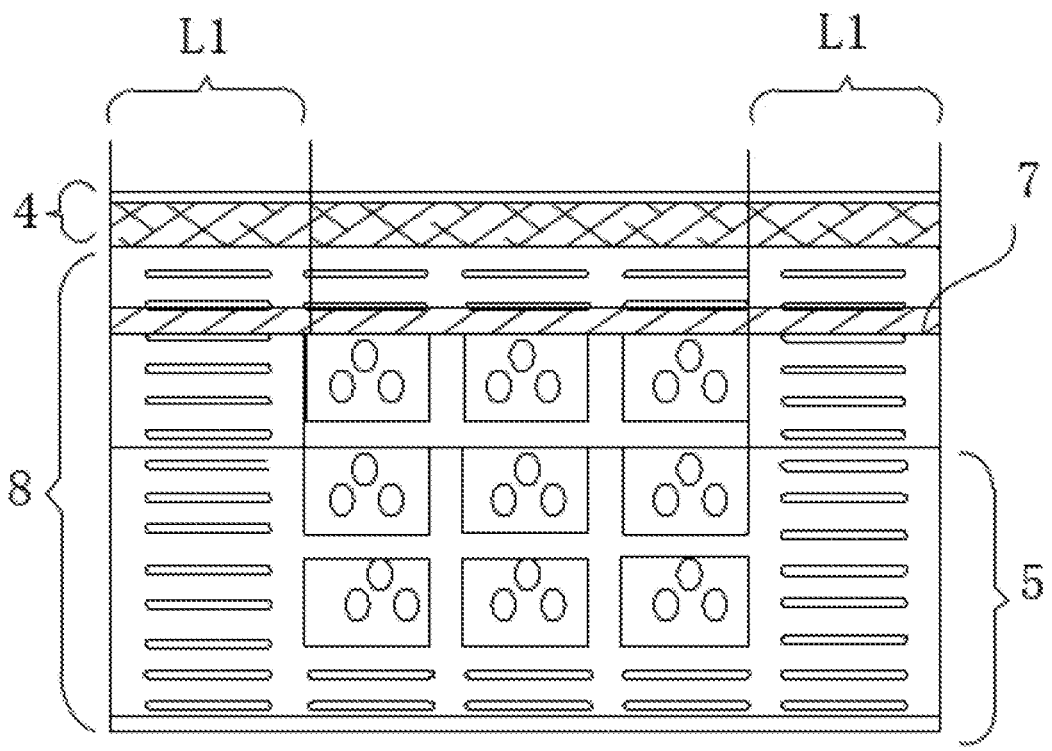
FIG. 3 is a schematic diagram showing a top plan view of a display panel according to an embodiment of the present disclosure.

As shown in FIG. 3, in an embodiment, both ends of the retaining wall 7 exceed the gold ball coating area 25, and a length of the retaining wall 7 exceeding the gold ball coating area 25 is at least 20 um and no more than 1000 um.

The retaining wall 7 completely blocks and protects the display area 4 and blocks the gold ball 6 from flowing into the display area 4, which provides the comprehensive protection, makes the side does not leak light, and improves the anti-light leakage effect.

A shape of the retaining wall 7 is selected from an elongated shape, a wave shape, an arc shape, or the like.

In an embodiment, both of the display area 4 and the non-display area 8 comprise support columns 9. The support columns 9 support the first substrate 2 and the second substrate 3 to form an interval. The retaining wall 7 and the support column 9 are made of same material.

The retaining wall 7 and the support column 9 are made of same material, thereby the material is reused, which reduce the cost. The support column 9 itself is relatively high, and the retaining wall 7 also has a height requirement. When heights of the two are not much different, the support column 9 and the retaining wall 7 can be conveniently produced by a same mask process.

In an embodiment, a height of the retaining wall 7 is at least 2.3 um and no more than 3.1 um.

The retaining wall 7 does not contact an upper substrate, and leaves some space for the movement of the gold ball 6. Because there are electrodes, there will be heat dissipation, some space are left for physical changes that the retaining wall 7 would occur to prevent the upper substrate from damage.

In an embodiment, the first substrate 2 comprises the display area 4, the non-display area 8 disposed in outer periphery of the display area 4, a first glass substrate 24, a black matrix layer 10 formed on the first glass substrate 24 and across the display area 4 and the non-display area 8, a color photoresist layer 29 formed on the black matrix layer 10 disposed in the display area 4, and a first electrode layer 11 formed on an entire surface of the uppermost layer of the first substrate 2. The second substrate 3 also comprises the display area 4. The display area 4 comprises an array device 26 and a pixel electrode 27. And the non-display area 8 comprises a peripheral double-layer metal wiring 28, an insulating layer 15, a second metal layer 18, a gate insulating layer, a first metal layer 16. The first substrate 2 and the second substrate 3 are connected by the sealant 5.

A second electrode layer 23 is disposed at a bottom portion of the groove 14, and is acted as the transfer pad 12. The first metal layer 18 and the first electrode layer 11 are electrically connected through the gold ball 6. The insulating layer 15 and the second substrate 3 are parallelly disposed. The retaining wall 7 is vertically disposed on a first surface of the insulating layer 15. A thickness of the insulating layer 15 is at least 1800 Å, and is no more than 2800 Å. The second metal layer 18 is disposed opposite to the insulating layer 15 and is disposed below the insulating layer 15. A thickness of the second metal layer 18 is at least 3000 Å and no more than 4000 Å. A bottom portion of the gate insulating layer 17 is horizontally connected with the transfer pad 12. A thickness of the gate insulating layer 17 is at least 3500 Å and no more than 4500 Å. The first metal layer 16 is parallel with the transfer pad 12 to support the transfer pad 12 and is electrically connected with the gold ball 6 to form a connection electrode. A thickness of the first metal layer 16 is at least 3500 Å and no more than 4000 Å. The gold ball coating area 25 comprises the gold ball 6 and the transfer pad 12. The transfer pad 12 is disposed in the non-display area. The gold ball is disposed on the transfer pad 12 and is electrically connected with the transfer pad 12. The second electrode layer 23 is disposed on the transfer pad 12. A width of the transfer pad 12 is at least 900 um and no more than 1200 um. The groove 14 is disposed at a position corresponding to the transfer pad 12. The transfer pad 12 is disposed on the bottom portion of the groove 14. A depth of the groove across the insulating layer 15, the second metal layer 18, and the gate insulating layer 17. And the bottom portion of the groove 14 is disposed corresponding to the second electrode layer. The groove 14 is square-shaped.

The display panel 1 is finely fabricated by each layer process to form an electrical connection, so that the display quality of the entire screen is improved. The first surface of the insulating layer 15 is an upper surface, and the insulating layer 15 protects the electrodes of the gold ball 6 from being short-circuited in series, thus, enabling the upper and lower substrates to work. An establishment of the retaining wall 7 ensures that the gold ball 6 is electrically connected to the upper and lower sides, and the retaining wall 7 blocks the gold ball 6 from flowing out of the transfer pad 12 and prevents the gold ball from approaching the display area 4, thereby preventing the light leakage. The metal wiring around the second substrate 3 are double-layer metal wiring, which reduce the resistance, prevent signal delay, and facilitate signal transmission. The groove 14 is disposed on the transfer pad. A conductive layer of the groove 14 is connected to lower metal layers through a hole of the groove 14. The gold ball 6 coats on the transfer pad 12, and is connected with the second electrode layer 26 on the groove and the first electrode layer 11 of the first substrate 2. Thus, the signal is finally transported to the first substrate 3 and the display quality of the display panel is improved.

Figure 4:
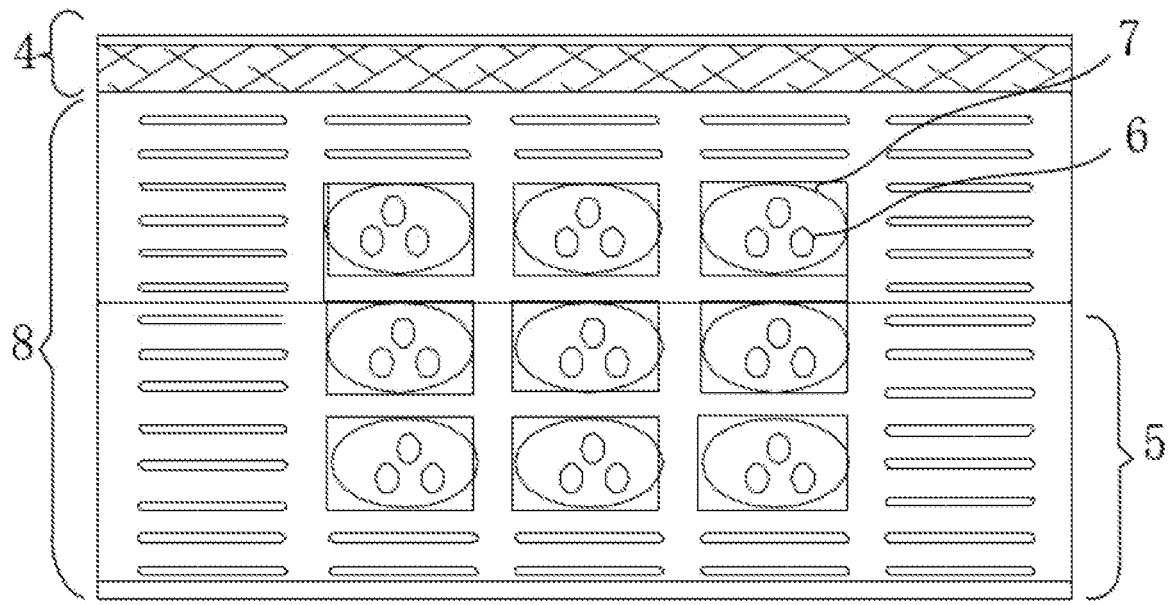
FIG. 4 is a schematic diagram showing a top plan view of a display panel according to an expanded embodiment of the present disclosure.

In an embodiment, the retaining wall 7 is disposed around the gold ball 6, to be specific, the retaining wall 7 has two forms as follows:

As shown in FIG. 4, the retaining wall 7 is disposed around the gold ball 6 in the groove to form a closed space, which completely blocks an overflow of the gold ball.

Figure 5:
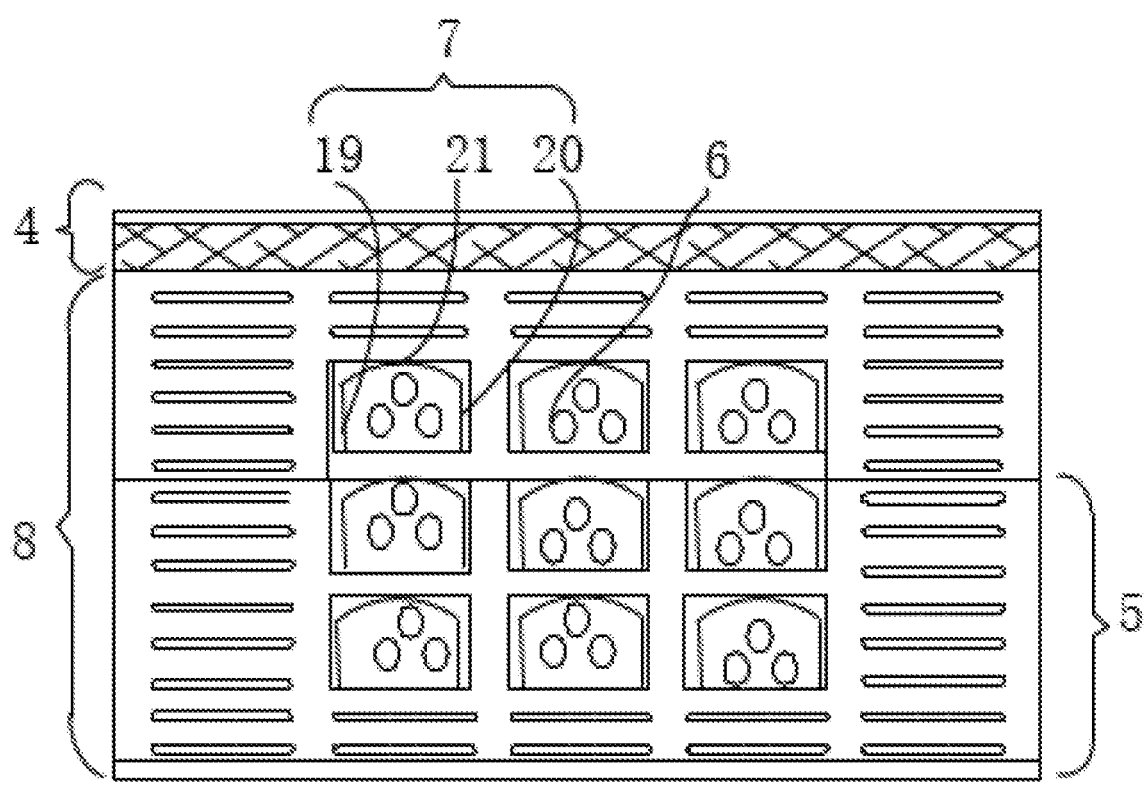
FIG. 5 is a schematic diagram showing a top plan view of a display panel according to an expanded embodiment of the present disclosure.

As shown in FIG. 5, the retaining wall 7 comprises a first vertical edge 19, a second vertical edge 20, and an arc-shaped edge 21. The first vertical edge 19 and the second vertical edge 20 are respectively disposed on two sides of the gold ball 6. An end of the first vertical edge 19 close to the display area 4 and an end of the second vertical edge 20 close to the display area 4 are connected by the arc-shaped edge 20. Each gold ball coating area corresponds to one retaining wall.

A wraparound protection of the retaining wall 7 makes a range of the movement of the gold ball 6 smaller, and enhances the protective effect, and reduces a probability that the gold ball 6 is flowing out.

In an embodiment, the second substrate 3 comprises a transfer pad 12 disposed between the sealant 5 and the display area 4. The gold ball 6 is disposed on the transfer pad 12 and is electrically connected with the transfer pad 12. The groove 14 is disposed on a position of the second substrate 3 corresponding to the transfer pad 12, and the transfer pad 12 is disposed at the bottom of the groove 14. The retaining wall 7 is disposed on the transfer pad 12.

The retaining wall 7 is fixed on a place close to a root of the gold ball 6, which provides a stronger protection against the gold ball 6, and is acted as a first layer protection of the gold ball 6. The groove 14 is disposed corresponding to the transfer pad 12. The groove 14 has a height difference against the gold ball 6, and is acted as a second layer protection of the gold ball 6. Thus, a double layer protection is constituted and the gold ball 6 is less likely to flow out, and the effect of anti-light leakage is improved.

As another embodiment of the present disclosure, as shown in FIG. 1 to FIG. 5, providing a display device 22. The display device 22 comprises the display panel 1. The display panel 1 comprises a first substrate 2, a second substrate 3 disposed opposite to the first substrate 2, a display area 4, a sealant 5 disposed in the non-display area 8 of the display pane 1, a gold ball coating area 25 disposed in the non-display area 8, and a retaining wall 7 disposed between the gold ball coating area 25 and the display area 4. The retaining wall 7 is configured to block a gold ball 6 from flowing into the display area.

In the display panel 1, the retaining wall 7 blocks the gold ball 6 from flowing into the display area 4, ultimately preventing light leakage, improving the display quality and display quality.

In an embodiment, the gold ball coating area 25 comprises the gold ball 6 and a transfer pad 12. The gold ball 6 is disposed on the transfer pad 12, and is electrically connected with the transfer pad 12. A groove 14 is disposed on the second substrate 3. And the transfer pad 12 is disposed at a bottom portion of the groove 14. The retaining wall 7 is disposed at an edge of a side of the groove 14 close to the display area 4.

The groove 14 blocks the overflow of the gold ball 6, and the retaining wall 7 further blocks the overflow of the gold ball 6 again, increasing a strength of protection, and the protective effect is more obvious.

In an embodiment, both ends of the retaining wall 7 exceed the gold ball coating area 25, and a length of the retaining wall exceeding the gold ball coating area is at least 20 um and no more than 1000 um.

Both ends of the retaining wall 7 exceed the gold ball coating area 25, which further increases the blocking strength, and the gold ball 6 cannot pass over the retaining wall 7 and the protective effect is obvious.

In an embodiment, the display panel 1 comprises a support column 9. The support column 9 supports the first substrate 2 and the second substrate 3 to form an interval. The retaining wall 7 and the support column 9 are made of same material.

The material of the support column 9 is same as the retaining wall 7 so that the support column 9 and the retaining wall 7 are bale to be made together, which save an extra process.

A panel of the present disclosure is selected from a twisted nematic (IN) panel, an in-plane switching (IPS) panel, and a vertical alignment (VA) panel. Of course, other types of panels are used as long as they are applicable.

The above content is a further detailed description of the present disclosure in conjunction with the specific optional embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A display panel, comprising:
   a first substrate;
   a second substrate disposed opposite to the first substrate;
   a display area;
   a sealant disposed in a non-display area of the display panel;
   a gold ball coating area disposed in the non-display area; and
   a retaining wall disposed between the gold ball coating area and the display area;
   wherein the retaining wall is configured to block a gold ball from flowing into the display area;
   wherein the gold ball coating area comprises the gold ball and a transfer pad; the gold ball is disposed on the transfer pad, and is electrically connected with the transfer pad; a groove is disposed on the second substrate, and the transfer pad is disposed at a bottom portion of the groove; the retaining wall is disposed at an edge of a side of the groove close to the display area; and
   wherein a lower portion of the gold ball lies within the groove.

2. The display panel according to claim 1, wherein both ends of the retaining wall exceed the gold ball coating area, and a length of the retaining wall exceeding the gold ball coating area is at least 20 um and no more than 1000 um, wherein the length of the retaining wall runs parallel to an interface between the non-display area and the display area.

3. The display panel according to claim 1, wherein a length of the retaining wall is equal to a length of the gold ball coating area, wherein the length of the retaining wall runs parallel to an interface between the non-display area and the display area.

4. The display panel according to claim 1, wherein the display panel comprises a support column configured to support the first substrate and the second substrate to form an interval; the retaining wall and the support column are made of a same material.

5. The display panel according to claim 1, wherein a height of the retaining wall is less than a height of the support column disposed in the display area.

6. The display panel according to claim 1, wherein a height of the retaining wall is at least 2.3 um and no more than 3.1 um.

7. The display panel according to claim 1, wherein the first substrate comprises:
   the display area;
   the non-display area disposed in an outer periphery of the display area;
   a first glass substrate;
   a black matrix layer formed on the first glass substrate and across the display area and the non-display area;
   a color photoresist layer formed on the black matrix layer disposed in the display area; and
   a first electrode layer formed on an entire surface of the uppermost layer of the first substrate;
   wherein the second substrate also comprises:
   the display area;
   wherein the display area comprises an array device and a pixel electrode; and the non-display area comprises a peripheral double-layer metal wiring, an insulating layer, a second metal layer, a gate insulating layer, and a first metal layer; the first substrate and the second substrate are connected by the sealant.

8. The display panel according to claim 7, wherein the first substrate comprises a second electrode layer disposed at a bottom portion of a groove, a second electrode layer is acted as a transfer pad; the first metal layer and the first electrode layer are electrically connected through the gold ball; and the insulating layer and the second substrate are parallelly disposed; the retaining wall is vertically disposed on a first surface of the insulating layer; a thickness of the insulating layer is at least 1800 Å and no more than 2800 Å;
   wherein the second metal layer is disposed opposite to the insulating layer and is disposed below the insulating layer; a thickness of the second metal layer is at least 3000 Å and no more than 4000 Å;

wherein a bottom portion of the gate insulating layer is horizontally connected with the transfer pad; a thickness of the gate insulating layer is at least 3500 Å and no more than 4500 Å;

wherein the first metal layer is parallel with the transfer pad to support the transfer pad and is electrically connected with the gold ball to form a connection electrode; a thickness of the first metal layer is at least 3500 Å and no more than 4000 Å;

wherein the gold ball coating area comprises the gold ball and the transfer pad; the transfer pad is disposed in the non-display area; the gold ball is disposed on the transfer pad and is electrically connected with the transfer pad; the second electrode layer is disposed on the transfer pad; a width of the transfer pad is at least 900 um and no more than 1200 um;

wherein the groove is disposed at a position corresponding to the transfer pad, the transfer pad is disposed on the bottom portion of the groove; a depth of the groove across the insulating layer, the second metal layer, and the gate insulating layer; and the bottom portion of the groove is disposed corresponding to the second electrode layer.

9. The display panel according to claim 1, wherein the retaining wall comprises a first vertical edge, a second vertical edge, and an arc-shaped edge; the first vertical edge and the second vertical edge are respectively disposed on two sides of the gold ball; an end of the first vertical edge close to the display area and an end of the second vertical edge close to the display area are connected by the arc-shaped edge; each gold ball coating area corresponds to one retaining wall, wherein the first vertical edge, the second vertical edge, and the arc-shaped edge of the retaining wall are all disposed perpendicular to a plane of the first substrate or the second substrate.

10. The display panel according to claim 1, wherein the retaining wall is disposed surrounding the gold ball.

11. The display panel according to claim 1, wherein the transfer pad is disposed in the non-display area; signals of a first metal layer disposed at a bottom portion of transfer pad are transmitted to a first electrode layer disposed on the first substrate by the gold ball; the retaining wall is disposed on the transfer pad.

12. The display panel according to claim 1, wherein the transfer pad is a flat plate in close contact with the bottom portion of the groove, which is also flat, and the gold ball is disposed on and in contact with the transfer pad, and the lower portion of the gold ball lies within the groove.

13. The display panel according to claim 9, wherein each gold ball coating area comprises a plurality of gold balls disposed in this gold ball coating area.

14. The display panel according to claim 9, wherein the gold ball is situated in the space enclosed by the first vertical edge, the second vertical edge, and the arc-shaped edge of the retaining wall.

15. A display panel, comprising:
a first substrate;
a second substrate disposed opposite to the first substrate;
a display area;
a sealant disposed in a non-display area of the display panel;
a gold ball coating area disposed in the non-display area; and
a retaining wall disposed between the gold ball coating area and the display area;
wherein the retaining wall is configured to block a gold ball from flowing into the display area; wherein the gold ball coating area comprises the gold ball and a transfer pad; the gold ball is disposed on the transfer pad, and is electrically connected with the transfer pad; a groove is disposed on the second substrate, and the transfer pad is disposed at a bottom portion of the groove; the retaining wall is disposed at an edge of a side of the groove close to the display area; the retaining wall does not coincide with the transfer pad, but the retaining wall is in a place to be bordered with the transfer pad; both ends of the retaining wall exceed the gold ball coating area, and a length of the retaining wall exceeding the gold ball coating area is at least 20 um and no more than 1000 um; both of the display area and the non-display area comprise support columns; the support columns support the first substrate and the second substrate to form an interval; the retaining wall and the support column are made of same material; a height of the retaining wall is less than a height of the support column disposed in the display area; a height of the retaining wall is at least 2.3 um, and no more than 3.1 um;

wherein a lower portion of the gold ball lies within the groove.

16. A display device, comprising a display panel; wherein the display panel comprises:
a first substrate;
a second substrate disposed opposite to the first substrate;
a display area;
a sealant disposed in a non-display area of the display panel;
a gold ball coating area disposed in the non-display area; and
a retaining wall disposed between the gold ball coating area and the display area;
wherein the retaining wall is configured to block a gold ball from flowing into the display area;
wherein the gold ball coating area comprises the gold ball and a transfer pad; the gold ball is disposed on the transfer pad, and is electrically connected with the transfer pad; a groove is disposed on the second substrate, and the transfer pad is disposed at a bottom portion of the groove; the retaining wall is disposed at an edge of a side of the groove close to the display area; and
wherein a lower portion of the gold ball lies within the groove.

17. The display device according to claim 16, wherein both ends of the retaining wall exceed the gold ball coating area, and a length of the retaining wall exceeding the gold ball coating area is at least 20 um and no more than 1000 um.

* * * * *